Dec. 31, 1929.   E. BUCHWALD   1,741,554
APPLIANCE FOR CUTTING OR SAWING CARCASSES OF DEAD ANIMALS
Filed Jan. 26, 1928   3 Sheets-Sheet 1
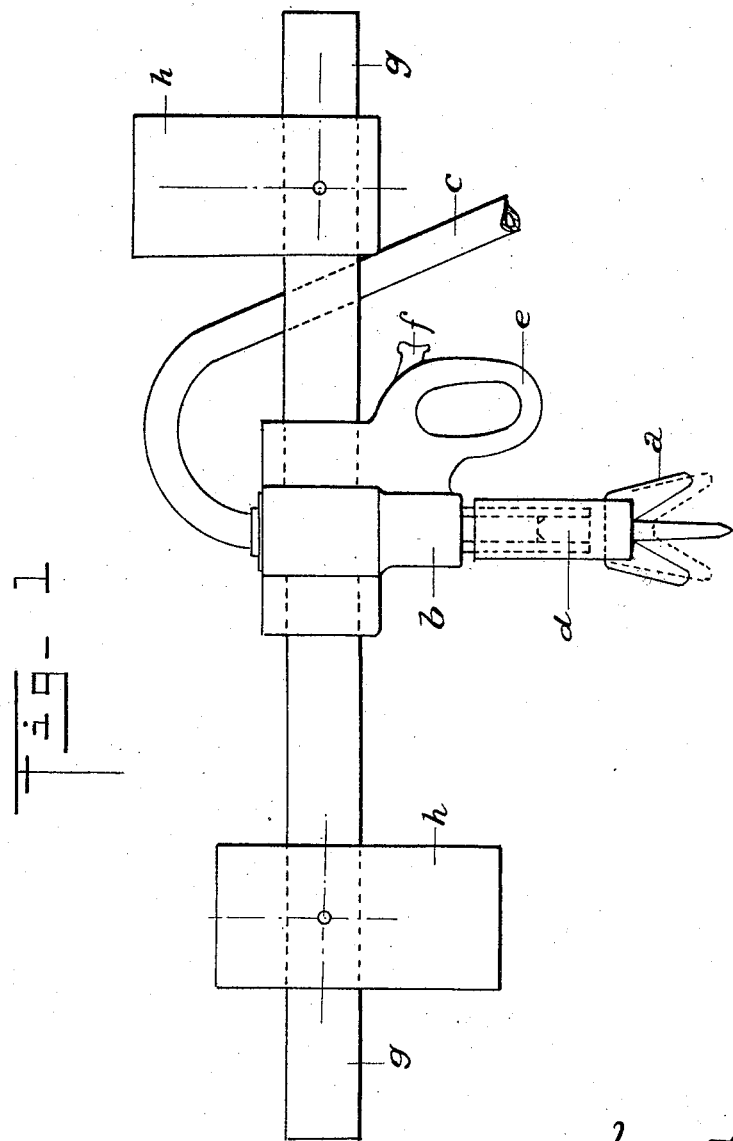
Inventor:
Emilio Buchwald
by George C. Henning
Attorney.

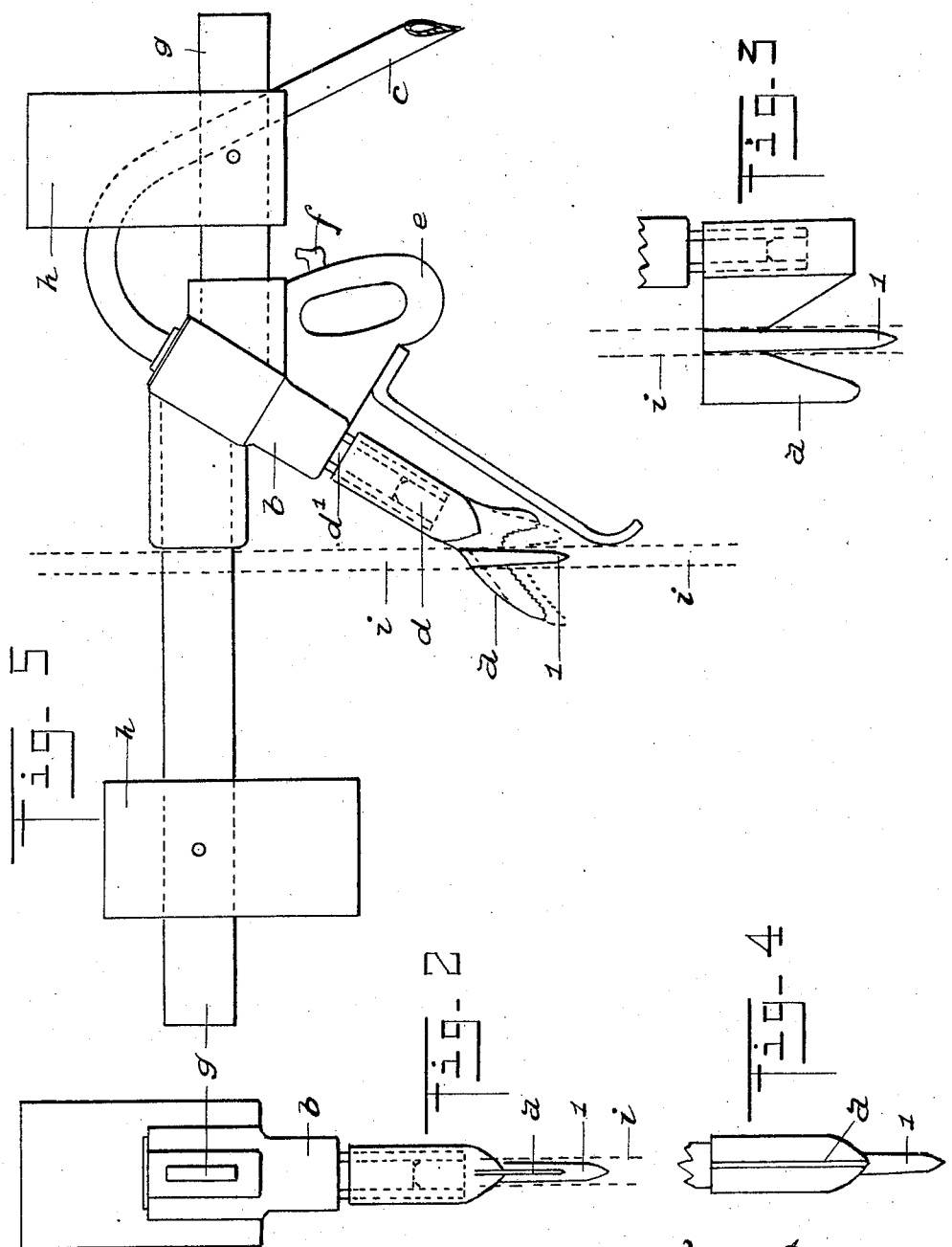

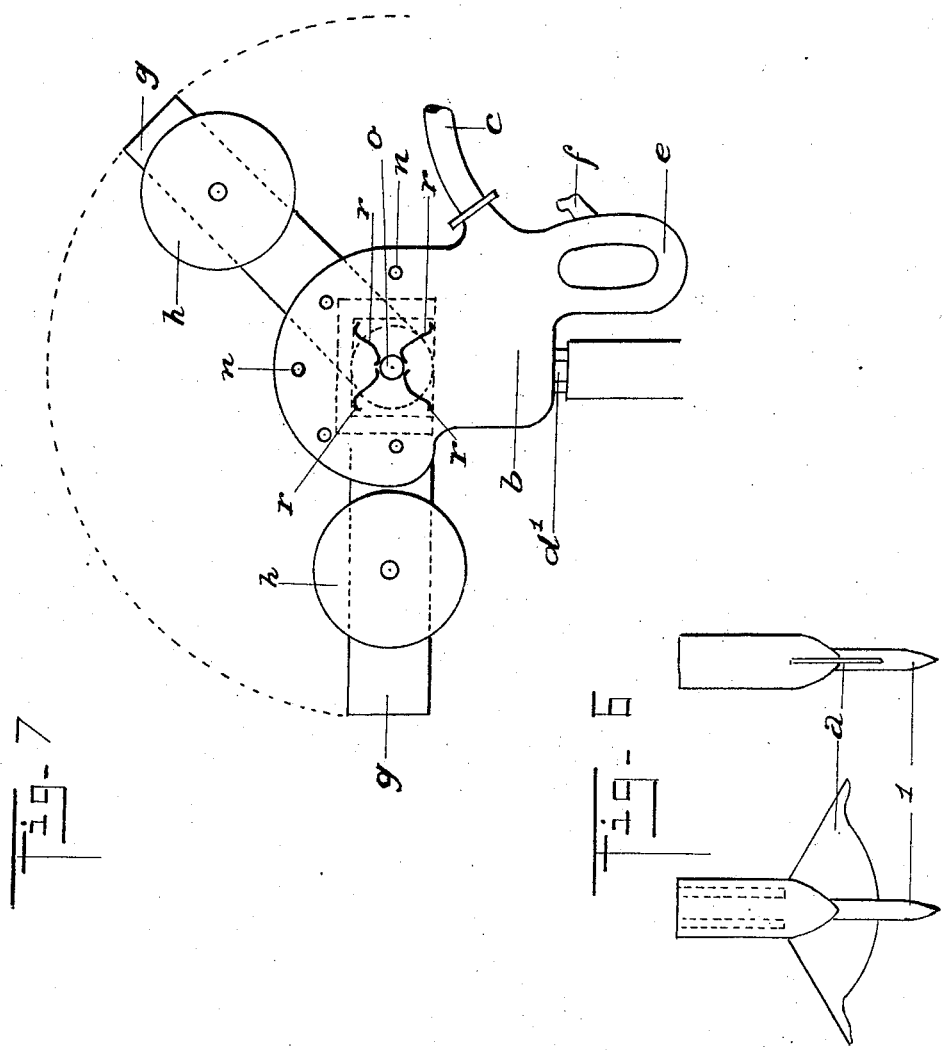

Patented Dec. 31, 1929

1,741,554

UNITED STATES PATENT OFFICE

EMILIO BUCHWALD, OF BUENOS AIRES, ARGENTINA

APPLIANCE FOR CUTTING OR SAWING CARCASSES OF DEAD ANIMALS

Application filed January 26, 1928, Serial No. 249,676, and in Argentina October 25, 1927.

My invention refers to improvements in pneumatically operated butchering tools, particularly to, a novel appliance for cutting, splitting or sawing carcasses destined principally for food purposes, and with which it is possible to rapidly and neatly split a carcass into sides with precision by unskilled labor in a comparatively short time.

Another object of my invention is the provision of a device of this character equipped with means for balancing the pneumatically operated cutting and splitting tools during the operation and to absorb the shocks incident to the pneumatic operation of the cutter.

These and other objects and advantages of my invention will become more fully known as the description thereof proceeds and will then be specifically defined in the appended claims.

In the accompanying drawings forming a material part of this disclosure:

Fig. 1 is a side view of the appliance constructed according to my invention.

Fig. 2 is a front view thereof.

Fig. 3 is a fragmentary side elevation of a cutter and its guide.

Fig. 4 is a front view of the same.

Fig. 5 is a side view of a modified form of the same appliance.

Fig. 6 shows side and front views of modifications of the knives of the appliance, and Fig. 7 is a modification of the appliance.

As illustrated, the carcass cutter comprises a knife or saw (a) of special form, preferably forked in shape (Figs. 1 and 3) or of half-moon shape (Fig. 6), it will be evident that the shape of the knives may be varied according to requirements in practice; in the same manner all the forms of said knives (a) may be sharp-edged or toothed. These knives have each, a guide (1) destined to be introduced at the top of the carcass, in the hollow part of the vertebra.

The knife (a) is operated by a pneumatic appliance (b), which receives the compressed air through the pipe (c), an alternating movement being produced, when the compressed air strikes against the hammer or piston (d) and causes the knife to move downwards as is shown in the dotted lines (A¹) of Figs. 1 and 5.

To the ordinary pneumatic apparatus (b), which has therefore been shown in its outlines only, is attached the handle (e) with the trigger (f), which serves to regulate the supply of compressed air.

Bars (g) are also attached to apparatus b and carry the counterweights (h), which are movable and can be secured at the most convenient point, in order to balance and produce pressure in a downward sense when the appliance is in movement.

In order to cushion the balancing and pressure operations of the counterweights (h), I have introduced the modification which is shown in Fig. 7.

The bars (g) carrying the counterweights (h), which may be placed in different positions, have a rotating movement around o as its center, and the bars can be secured in their adjusted positions by means of pins n passing through suitable holes in these bars and in the pneumatic body b, while springs r are suitably provided to absorb the shocks caused during the operation of the pneumatic hammer.

The application or attachment of the knives, their guides to the pneumatic appliance, is effected by means of oxygen soldering, riveting, etc., as may be most suitable in practice.

The device operates as follows:—

When the carcass has been placed in the usual position, the apparatus is taken by the handle (e) and applied to the carcass at the point where it is desired to start the cutting, always at its upper part, the dotted line (i) showing the imaginary line of the carcass, and the proper operation of trigger (f) will supply the compressed air through pipe (c), and will cause the working of the appliance with its characteristic movement, that is, a rapid and strong alternating movement of the piston d' striking hammer d operating the knives and, the cutting or sawing being effected in an extremely rapid manner.

By means of the direction governed by the guide (1) which is introduced above in the hollow part of the vertebræ of the carcasses, an ideal guide is obtained over the entire length of the animal.

In this manner, the knife will be guided exactly along the center line of the carcass, and it is possible to divide the carcass in two equal parts.

The counterweights (h) serve the purpose of avoiding undue exertions on the part of the operator in pushing the appliance, and the springs arranged in the modification (Fig. 7) reduce the vibrations characteristic of pneumatic appliances (b), the activity of the operator reducing itself to guiding the direction and movement of the apparatus.

The materials employed in the different parts of the apparatus are those best adapted in practice.

Described as has been my invention, I claim as my exclusive right "a new appliance for cutting or sawing carcasses of dead animals," constituted by:

1. In a pneumatically operated carcass splitter, including its cutting tools, a pneumatically operated piston, for operating said tools, a handle therefor, a starting and stopping trigger, a guide for the splitter tools adapted to enter the vertebræ cavity of the carcass weighted movable bars for weighing the splitter, means for adjusting and locking the bars and their weights in their relative position, and a means for cushioning the vibrations of the pneumatically operated piston during its operation.

2. In a pneumatically operated carcass cutter including its cutting tools, means for guiding said tools during their operation, a pneumatically operated hammer, a perforated casing therefor, a handle on said casing, a pair of levers pivotally secured at their meeting ends to said casing, and having perforations, shiftable weights on said levers, and pins entering the perforations in said casing and said levers to adjust and lock the weights in their relative adjusted position, and a plurality of springs for cushioning the vibration of the hammer during its pneumatic operation.

In testimony whereof I affix my signature.

EMILIO BUCHWALD.